(12) United States Patent
Richter

(10) Patent No.: US 7,344,114 B2
(45) Date of Patent: Mar. 18, 2008

(54) APPARATUS SUPPORT DEVICE WITH SUCTION RETAINING STRUCTURE

(76) Inventor: Harald Richter, Hönestrasse 32, 75331, Englesbrand (DE)

( * ) Notice: Subject to any disclaimer, the term of this patent is extended or adjusted under 35 U.S.C. 154(b) by 261 days.

(21) Appl. No.: 11/287,762

(22) Filed: Nov. 28, 2005

(65) Prior Publication Data

US 2007/0080267 A1 Apr. 12, 2007

(30) Foreign Application Priority Data

Oct. 6, 2005 (EP) ................................ 05 021 792

(51) Int. Cl.
*A45D 42/14* (2006.01)
(52) U.S. Cl. ................................ 248/205.5; 248/206.1; 248/309.3
(58) Field of Classification Search ............. 248/205.5, 248/205.6, 205.7, 205.8, 205.9, 206.1, 206.2, 248/683, 363, 362, 309.3
See application file for complete search history.

(56) References Cited

U.S. PATENT DOCUMENTS 5,845,885 A 12/1998 Carnevali
6,913,232 B2 * 7/2005 Richter ..................... 248/205.8
7,178,771 B2 * 2/2007 Richter ..................... 248/205.8
2002/0166936 A1 11/2002 Carnevali
2003/0102419 A1 6/2003 Carnevali

FOREIGN PATENT DOCUMENTS

DE 203 13 215 11/2003
DE 20 2005 005 863 7/2005

* cited by examiner

Primary Examiner—Ramon O Ramirez
(74) Attorney, Agent, or Firm—Klaus J. Bach

(57) ABSTRACT

In an apparatus support device with a suction retaining structure for supporting minicomputers, navigation devices or mobile telephones, comprising a suction foot, a hollow column connected with one end to the suction foot and enclosing an operating mechanism for the suction foot and a joint structure disposed at the other end of the hollow column and supporting an apparatus holder, the hollow column consists of two complementary semi-shells which, with their bottom ends, extend around the suction foot and are provided at their opposite ends with joint structures which are releasably clamped between the semi-shells.

6 Claims, 4 Drawing Sheets

APPARATUS SUPPORT DEVICE WITH SUCTION RETAINING STRUCTURE

BACKGROUND OF THE INVENTION

The invention relates to an apparatus support device with a suction retaining structure, disposed at one end of a hollow column and a joint structure disposed at the opposite end and carrying a support plate for the attachment of an apparatus or an apparatus holder.

Such apparatus support devices are used for example in motor vehicles for the support of mini computers generally called PDAs (Personal Digital Assistant) mobile navigation apparatus and mobile telephones.

It is known for example from Applicants' earlier U.S. Pat. No. 7,178,791 to provide such an apparatus with a hollow column having at one end a suction engagement structure and at the opposite end a joint structure with an apparatus holder or a mounting plate for supporting an apparatus holder. Such a column is advantageous because the arrangement is very rigid and therefore subject to little vibrations. In addition, the column accommodates the operating mechanism for a suction retaining structure of which only the operating lever extends from the column.

In the known arrangement, the hollow column is in the form of a single-piece component and is connected to the suction retaining structure by screws. The bottom end of the hollow column is disposed on the top wall of the suction retaining structure which extends radially beyond the hollow column.

It is the object of the present invention to provide an improved design for such an apparatus support device particularly with regard to the mounting of the device to a vehicle's windshield which, with its smooth surface, is the most suitable mounting location available but which is highly inclined in modern motor vehicles.

SUMMARY OF THE INVENTION

In an apparatus support device with a suction retaining structure for supporting minicomputers, navigation devices or mobile telephones, comprising a suction foot, a hollow column connected with one end to the suction foot and enclosing an operating mechanism for the suction foot, and a joint structure disposed at the other end of the hollow column and supporting an apparatus holder, the hollow column consists of two complementary semi-shells which, with their bottom ends, extend around the suction foot and are provided at their opposite ends with joint structures which are releasably clamped between the semi-shells.

Such an arrangement has a number of advantages: Since the lower edges of the semi-shells extend around the suction retaining structure housing and are not disposed on top of the suction retaining structure housing as it is the case in conventional arrangements, the stability of the whole arrangement is increased and also the appearance of the device is more pleasing. Since the hollow column is composed of two semi-shells which are joined so that a banana-like curved column can be formed the mounting of the apparatus support device to the slanted windshields is facilitated. In addition, the assembly of the apparatus support device including the pivot mechanism on the top of the column is simplified and more expedient.

Below, an embodiment of the invention will be described in greater detail with reference to the accompanying drawings.

DESCRIPTION OF A PREFERRED EMBODIMENT

Figure 1:
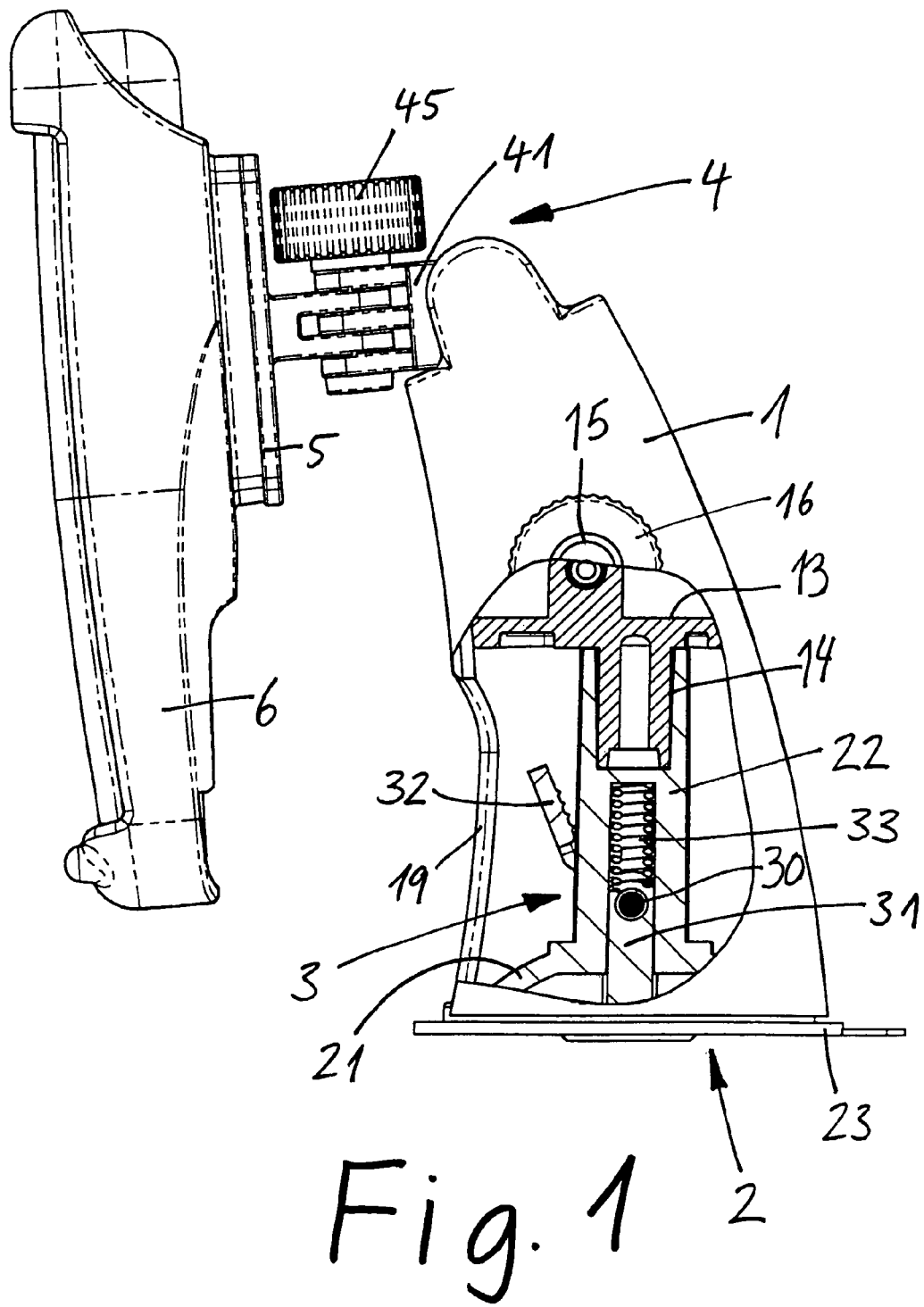
FIG. 1 is a side view of the apparatus support device with a side section cut-out to show the operating mechanism.
Figure 2:
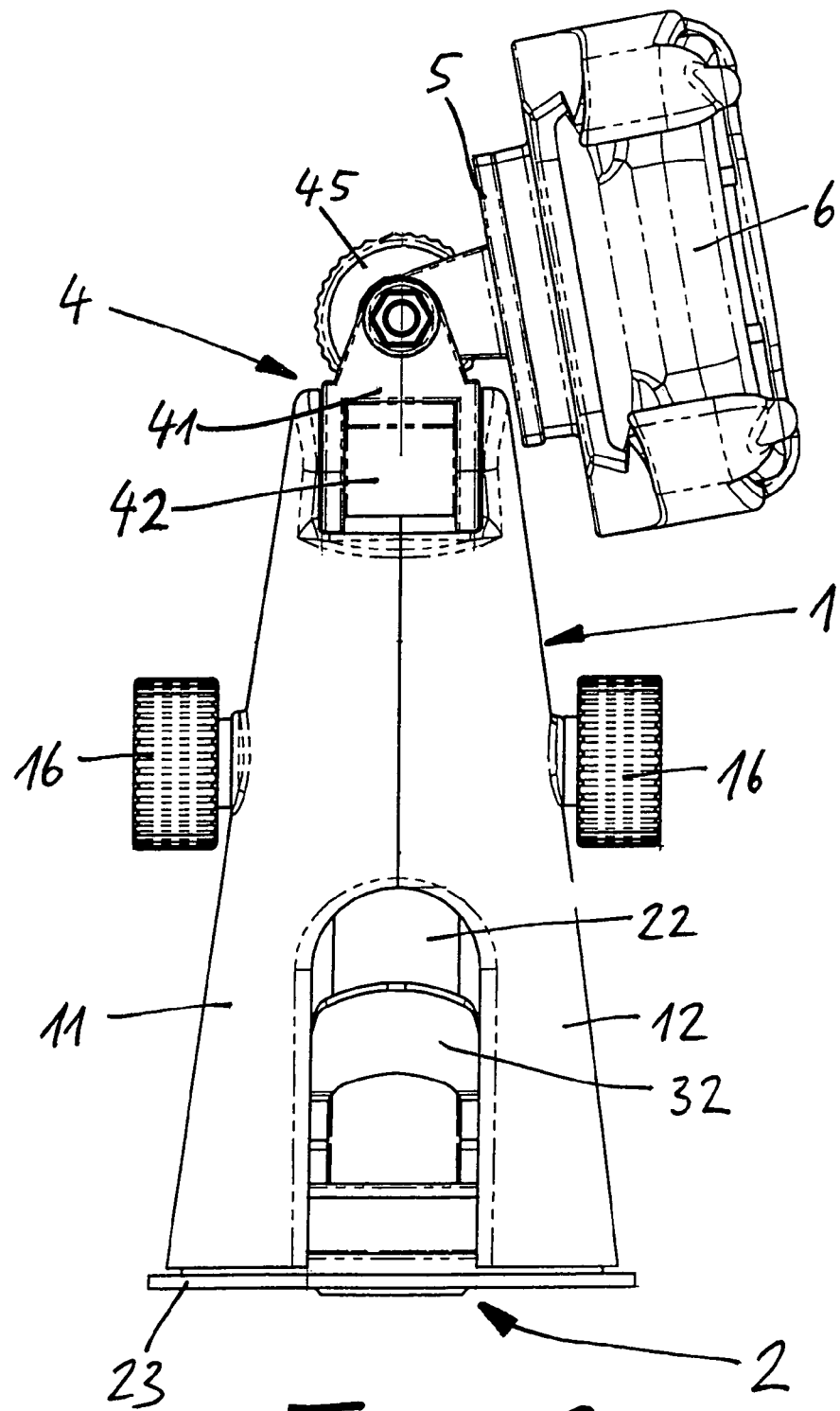
FIG. 2 is a view of the apparatus turned by 90° with respect to the view shown in FIG. 1 and the joint structure on the top shown in a different angular position.

The apparatus support device shown in the drawings comprises a hollow column 1, which extends between a suction retaining structure 2 at the bottom end thereof, an operating mechanism 3 for the suction retaining structure disposed in the hollow column 1 and a joint mechanism 4 at the top end of the column with a support plate 5. On the support plate 6 an apparatus holder 5 is mounted for supporting a minicomputer, a navigation apparatus or a mobile telephone in such a way that it can be positioned as desired and arrested in such desired position. The exploded view of FIG. 3 clearly shows the individual parts of the apparatus.

The hollow cylindrical column is curved banana-like and consists of two complementary semi-shells 11 and 12. The suction retaining structure, called suction foot, comprises a suction foot housing 21 from which a sleeve 22 extends upwardly, a suction membrane 23 and the operating mechanism 3, which comprises a shaft 31 connected to the center of the suction membrane 23 and an operating lever 32, which is pivotally connected to the shaft 31 by a support pin 30. The pin 30 extends through the shaft 31 and through a guide slots 30' of the sleeve 22 and into a support openings 32' in the opposite ends of the operating lever 32, which abut the suction foot housing 21 via eccentric cams 34. By pivoting the operating lever from a top position to a lower position, the suction membrane 23 can be moved via the shaft 31 between a release position and an operating position. As also apparent from FIG. 1, the sleeve 22 includes a compression spring 33, which is also part of the operating mechanism 3 and which engages the upper end of the shaft 31 and biases the shaft 31 into a suction membrane release position.

In the upper end of the sleeve 22, a mounting block 13 for the two semi-shells 11 and 12 with a downwardly extending pin 14 is disposed. The mounting block 13 includes a threaded bush 15 into which clamping screws 16 can be threaded that extend from opposite sides through the semi-shells and are provided with operating handles in the form of for example knurled operating heads as shown in the exemplary embodiment. Instead of knurled heads for example winged heads may be provided as they are known from wing nuts. Otherwise, the mounting block 13 is disc-shaped wherein the circumferential disc area forms a support surface for the inner wall areas of the two semi-shells 11 and 12. The mounting block consequently forms together with the clamping screws 16 a support structure for the joining of the semi-shells 11, 12 of the hollow column 1 and for the connection of the column 1 to the suction foot 2. For the connection of the column to the suction foot 2, the pin 14 of the mounting block 13 may also be cemented into the sleeve 22 of the suction foot 2. It may also be welded or pressed into the sleeve 22 and secured therein by engagement therewith or in any other way.

Figure 3:
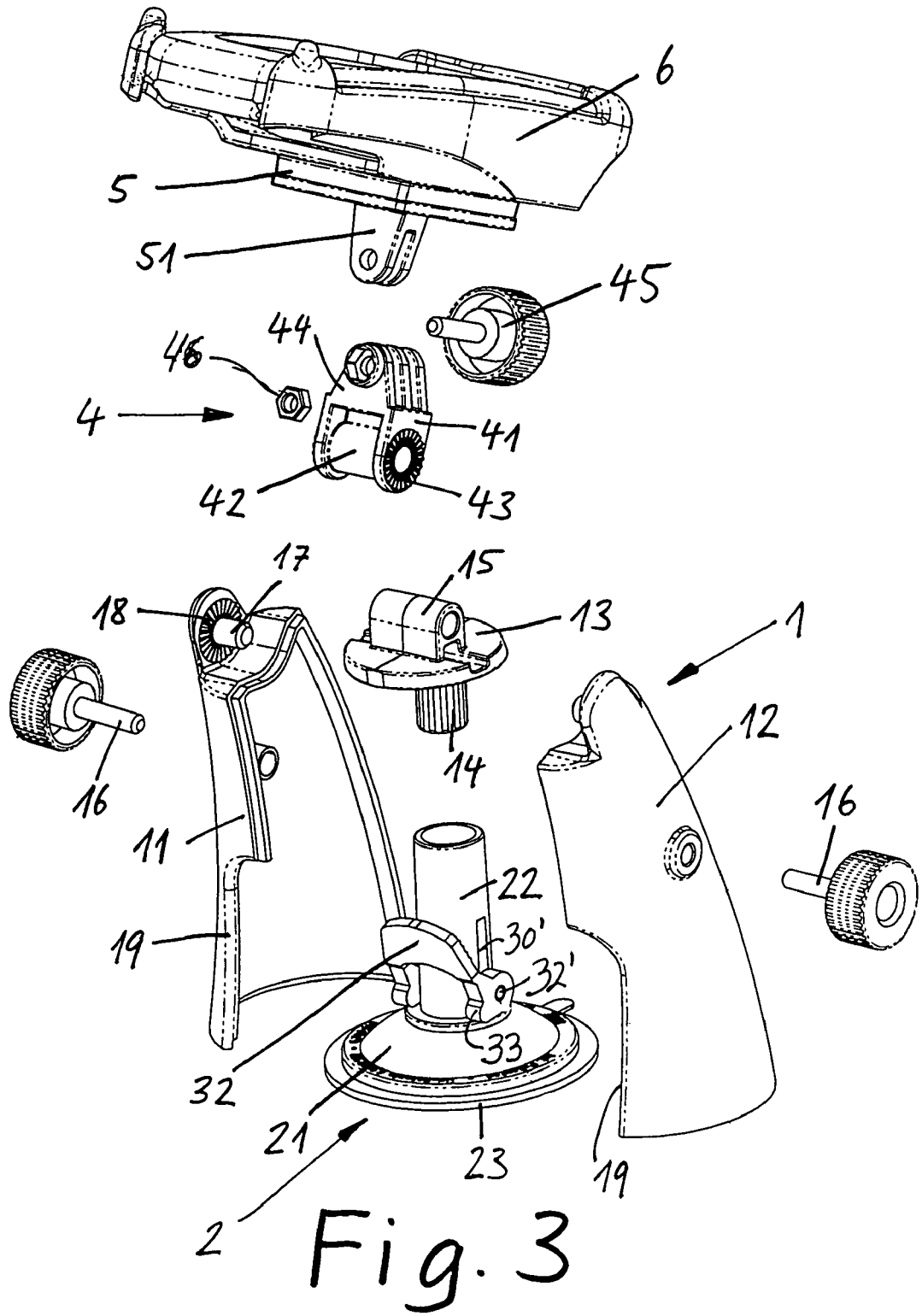
FIG. 3 is an exploded view of the apparatus support device according to the invention.

As apparent from FIG. 3, the semi-shells 11, 12 of the column 1 are provided at their adjacent edges with complementary engagement profiles for overlapping, form-locking interconnection during assembly. Upon assembly, the lower edges of the two semi-shells 11, 12 of the column 1 extend around the lower edge of the suction foot housing 21 and engage the lower edge of the suction foot 21 with a certain tension whereby a firm engagement with the suction foot is ensured. The arrangement is further such that the lower edge of the suction foot housing does not project downwardly beyond the surrounding lower edges of the semi-shells so that, in use when the suction foot is in suction position, the column 1 is disposed with the lower edges of the semi-shells directly on the suction membrane. In this way, the column is directly supported—via the suction membrane—on the support surface to which the suction foot is connected and thereby provides for a particularly stable and vibration-free support of the respective apparatus.

As further apparent from FIG. 3 and also from the other figures, the upper end areas of the two semi-shells 11, 12 of the column are so formed that they receive between them a joint structure 41 of the joint mechanism 4. In the embodiment shown, the joint mechanism 4 is in the form of double hinge joint with two interconnected joints having axes of rotation extending in planes disposed normally with respect to each other. The upper end areas of the semi-shells 11, 12 include each a pin 17 which extends into a bush 42 of the joint member 41. Furthermore, the end area of each semi-shell 11, 12 includes a radial annular tooth structure 18, which extends around the respective pin 17 and forms with a complementary radial tooth ring structure 43 at the opposite axial ends of the bush 42 of the joint structure 41 a ratchet structure. The upper end areas of the semi-shells 11, 12 of the column 1 form with the bush 42 of the joint structure 41 a hinge joint which is rotatable about the axis of the pin 17 and can be locked in a particular angular position by way of the complementary annular tooth structures. The hinge joint is locked when the clamping screws of 16 of the two half shells are tightened. By loosening the clamping screws 16 to a certain degree the compression and engagement between the two half shells can be loosened so that the joint structure 41 can be pivoted relative to the column 1 as the complementary cooperating tooth rings 18, 43 ratchet over each other. Upon reaching the desired pivot position, the hinge joint can be locked by tightening of the clamping screws 16.

The other hinge joint with an axis normal to that of the hinge joint structure 41 is formed by spaced tabs 44 projecting from the joint structure 41 and provided with aligned bores between which corresponding complementary tabs 51 extending from the support plate 5 are received which are also provided with aligned bores. A clamping bolt 45 extends through the aligned bores of the interleaved tabs 44 and 51 and, at the opposite side is threaded into a nut 46. Upon tightening of the clamping bolt 45, the interleaved tabs 44, 51 are firmly engaged with each other and the hinge joint is locked in the respective angular position. By slightly loosening the clamping bolt 45, the taps 44, 51 can be rotated relative to one another.

Figure 4:
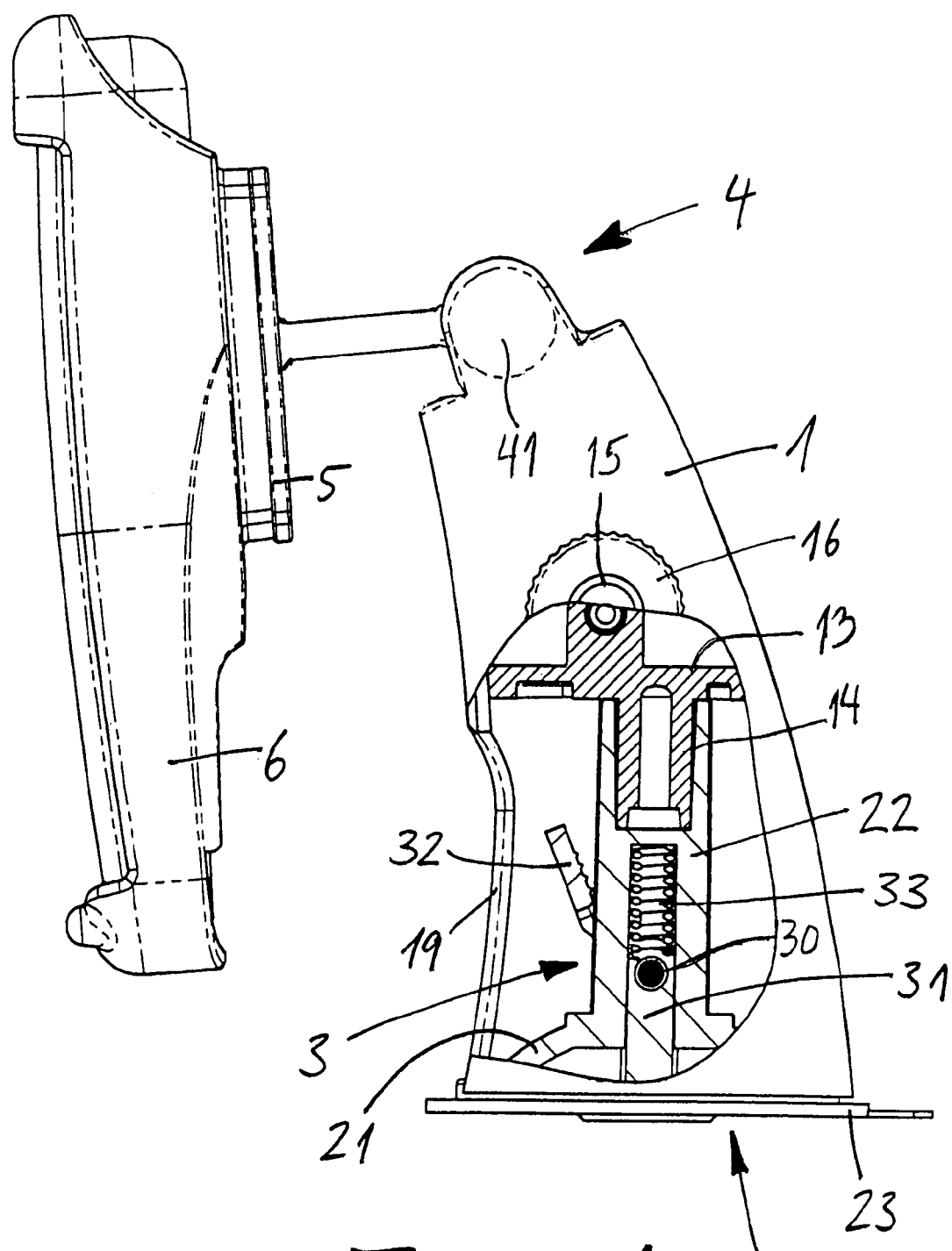
FIG. 4 shows an embodiment with a ball joint for forming the joint structure.

It is to be understood that the joint structure 4 in the form of a double hinge joint as shown in the embodiment described herein represents only a possible embodiment and that the joint mechanism 4 may also be provided in a different form, particularly in the form of a ball joint structure 46 as shown in FIG. 4, which is otherwise identical to FIG. 1. The upper end areas of the semi-shells 11, 12 would then form ball sockets and a joint member in the form of a ball would be received therein under tension so that it is supported in a swivel support arrangement. Such a ball joint mechanism could be locked in a particular desired position for example by tightening the clamping screw 16. By loosening the clamping screw, the lock would be released for adjusting the position of the support plate 5. The joint member including the joint ball may then be directly connected to the support plate 5. A joint structure in the form of a ball joint could also be in the form of a double ball joint with a dog-bone like joint member including two joint balls interconnected by a rod. One of the joint balls would then be received in the ball sockets formed in the upper semi-shells 11, 12 and the other joint ball would be received in a ball socket associated with the support plate 5. In this way, a universal adjustability would be provided for the position of an apparatus disposed on the support plate 5.

The apparatus holder 6 can be releasably connected to the support plate 5 by a rapid engagement coupling. This facilitates the mounting and the release of the respective apparatus holders which are adapted to accommodate a particular apparatus. Alternatively however, the apparatus holder may be firmly connected to support plate or a support plate may even be omitted and the apparatus holder directly connected to the respective joint member of the joint structure 4, that is for example, the apparatus holder itself may be provided with the tabs 51 or with a joint ball.

What is claimed is:

1. An apparatus support device with a suction retaining structure for supporting minicomputers, navigation devices and mobile telephones, comprising: a suction foot (2) with suction membrane (23), a hollow column (1) connected with one end thereof to the suction foot (2) and having an interior space, an operating mechanism (3) for the suction foot (2) disposed in the interior space and a joint structure (4) disposed at the other end of the hollow column (1) and supporting an apparatus holder (6), said hollow column (1) consisting of two complementary semi-shells (11, 12) which with their bottom ends extend around the suction foot (2) and at the opposite top end include joint elements (17) forming the joint structure (4) with one joint element (42) of the joint structure (4) being releasably clamped between the semi-shells (11, 12).

2. An apparatus according to claim 1, wherein the two semi-shells (11, 12) are provided along the jointure thereof with overlapping edges by which the semi-shells (11, 12) are interconnected in a form-locking manner.

3. An apparatus according to claim 2, wherein the two half shells (11, 12) extend with their bottom edges around the suction foot (2).

4. An apparatus according to claim 1, wherein at least one clamping screw (16) is provided for clamping the half shells into engagement with each other.

5. An apparatus according to claim 4, wherein the two semi-shells (11, 12) include a mounting block (13) disposed in the semi-shells (11, 12).

6. An apparatus according to claim 1, wherein the suction membrane (23) extends radially beyond the suction foot (2) and the hollow column (1) formed by the semi-shells is seated on the suction membrane (23) when the apparatus is attached to a support surface.

* * * * *